United States Patent [19]

Steinkuhl

[11] Patent Number: 5,249,664
[45] Date of Patent: Oct. 5, 1993

[54] SCRAPER UNITS FOR SCRAPER-CHAIN ASSEMBLIES

[75] Inventor: Bernd Steinkuhl, Lunen, Fed. Rep. of Germany

[73] Assignee: Westfalia Becorit Industrietechnik, GmbH, Fed. Rep. of Germany

[21] Appl. No.: 880,889

[22] Filed: May 8, 1992

[30] Foreign Application Priority Data

May 15, 1991 [DE] Fed. Rep. of Germany ....... 4115810

[51] Int. Cl.$^5$ .............................................. B65G 19/24
[52] U.S. Cl. ..................................... 198/731; 198/732
[58] Field of Search ......................... 198/728, 731, 732

[56] References Cited

U.S. PATENT DOCUMENTS

| 3,089,579 | 5/1963 | Beck | 198/731 |
| 3,653,492 | 4/1972 | Temme | 198/731 |
| 4,265,359 | 5/1981 | Temme | 198/731 |
| 4,383,603 | 5/1983 | Niemöller et al. | 198/731 |

FOREIGN PATENT DOCUMENTS

| 0079713 | 5/1983 | European Pat. Off. . | |
| 1506979 | 3/1969 | Fed. Rep. of Germany | 198/731 |
| 1937608 | 11/1978 | Fed. Rep. of Germany | 198/731 |
| 3016151 | 7/1984 | Fed. Rep. of Germany . | |
| 0393174 | 12/1973 | U.S.S.R. | 198/731 |
| 0876523 | 10/1981 | U.S.S.R. | 198/731 |
| 2077215 | 12/1981 | United Kingdom . | |
| 2137579 | 10/1984 | United Kingdom . | |
| 2192373 | 1/1988 | United Kingdom | 198/731 |

Primary Examiner—Robert P. Olszewski
Assistant Examiner—James R. Bidwell
Attorney, Agent, or Firm—Samuels, Gauthier & Stevens

[57] ABSTRACT

A scraper unit for a scraper-chain assembly is composed of a scraper and a clamping strap which define beds for receiving one or more chain links. The clamping strap is fixed to the scraper with the aid of nuts and bolts and one or more pivot joints formed between the strap and the scraper ensure that when the nuts are tightened onto the bolts, the clamping strap pivots on the scraper to clamp the chain link or links into position.

14 Claims, 2 Drawing Sheets

SCRAPER UNITS FOR SCRAPER-CHAIN ASSEMBLIES

FIELD OF THE INVENTION

This invention relates to a scraper unit for use with a scraper-chain assembly of a scraper-chain conveyor.

BACKGROUND TO THE INVENTION

As is known, scraper-chain conveyors, as used in mining, for example, usually employ a scraper-chain assembly with a series of scrapers attached to one or more chains. The scraper-chain assembly is then circulated along the pans of the conveyor to transport material along the conveyor from end to end. Each scraper is detachably connected to the chain or chains of the assembly with some form of fastening means so that the scrapers and their associated fastening means collectively form scraper units.

One form of scraper unit is described in GB-2077215. In this known design, the scraper-chain assembly has a pair of central chains and the scraper units are composed of scrapers and clamping straps. The scrapers each have vertical flange plates on either side of a pocket for receiving chain links and these flange plates are machined with bores. The clamping strap is also provided with pockets for receiving the chain links so that the links are trapped between the clamping strap and the scraper. The clamping strap has plate portions with bores which align with the bores in the flange plates of the associated scraper. Bolts fit through the aligned bores and nuts are tightened onto the bolts to secure the strap to the scraper. The flanges of the scrapers and the plates of the strap have inter-engaging faces. Either these faces are offset from the vertical or else the bores are inclined to the floor plates of the conveyor pans to create an upwardly directed force as the nuts are tightened on the bolts to draw the strap towards the scraper and firmly secure the chain links in the pockets. The special shaping of the components which make up the known scraper unit involves high manufacturing costs. Moreover, the nuts and bolts tend to slacken off during use and the resultant play of the chain links causes heavy wear to the pockets.

A general object of the invention is to provide a scraper unit of improved design and performance.

SUMMARY OF THE INVENTION

The present invention provides, as is known, a scraper unit composed of a scraper and a clamping strap. The scraper and the clamping strap are connected to one another with screw-threaded connectors to attach the unit to one or more links of at least one chain of the scraper-chain assembly. In accordance with the invention, however, there is a pivot joint pivotably connecting the scraper to the clamping strap. By reason of this pivot joint, the clamping strap can be reliably pressed against the chain link or links in a force locking manner as the associated connector is fastened. The bores for receiving the connector or connectors may be horizontal or inclined.

A durable clamping action can be established even when the unit is used under changing conditions for long periods of operation.

Conveniently, for a dual chain assembly, there are two pivot joints, one on either side of the chain links. The or each pivot joint can be created by providing a projection or pivot journal in the style of a rounded dog integral with, or otherwise connected to, the scraper and a bearing cup or bore in the clamping strap for receiving this pivot journal. The or each pivot journal for the pivot joint is preferably located in an upper head portion of the scraper above the screw connectors, while the associated bore is arranged in an upwardly extending projection of the clamping strap. This arrangement provides a relatively long lever arm which provides adequate torque for the desired positive clamping action exerted on the chain link or links. Preferably the scraper has two wings or blades extending laterally outwards from a central head portion. The scraper and the strap preferably possess flat shaped beds with pockets for locating the chain links.

In another embodiment of the invention, the or each pivot joint is composed of a dog-like projection on the clamping strap fitting in a part spherical recess in the scraper or vice-versa. As the associated screw connector is tightened, the pivotal movement between the strap and the scraper also tends to secure the screw connector as well.

The invention may be understood more readily, and various other aspects and features of the invention may become apparent, from consideration of the following description.

BRIEF DESCRIPTION OF THE DRAWINGS

An embodiment of the invention will now be described, by way of example only, and with reference to the accompanying drawings, wherein.

DESCRIPTION OF PREFERRED EMBODIMENT

Figure 1:
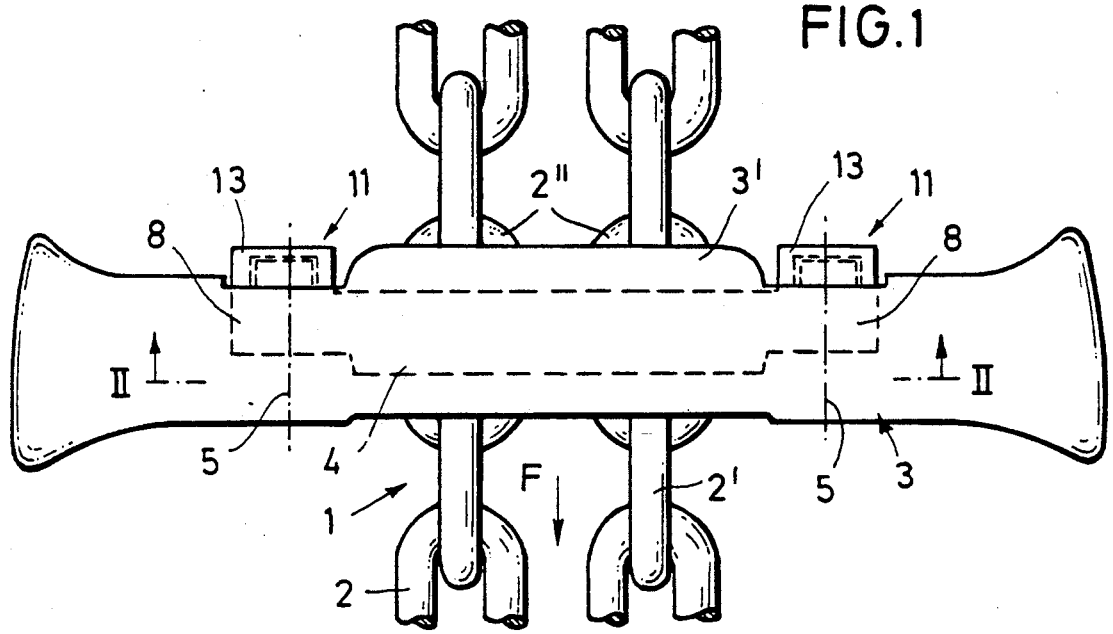
FIG. 1 is a schematic plan view of part of a scraper-chain assembly and a scraper unit constructed in accordance with the invention.

FIG. 1 shows part of a scraper-chain assembly 1 with two oval-link chains 2,2' to which are connected scraper units 3, 4 at spaced locations, longitudinally of the chains 2,2'.

As is known, the scraper-chain assembly 1 is driven along the pans of a conveyor-with the chains 2,2' running along a central region of the pans so that the scrapers transfer material along the pans in the conveying direction F.

Figure 2:
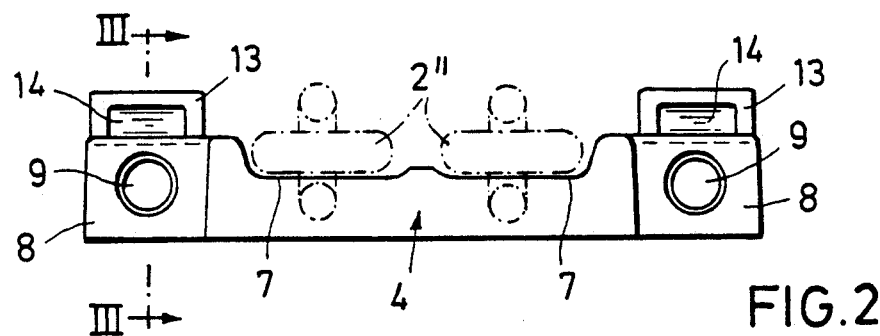
FIG. 2 is a front view of a clamping strap employed in the scraper unit, the view being taken on a somewhat larger scale to FIG. 1.

Each scraper unit is composed of a scraper 3 and a clamping strap 4 fastened together with nuts and bolts forming a screw connectors indicated with chain-dotted lines 5 in FIG. 1. The scraper 3 has two lateral wings or blades extending outwardly from a central region for entraining material. The strap 4 has a generally flat shaped bed 7 which engages beneath a pair of horizontal links 2" of the chains 2, 2' as shown in FIG. 2. The central region of the scraper 3 is composed of a head portion 3' provided with a recess at the underside for snugly receiving the strap 4. The head portion 3' has a shaped bed 6 on its underside for engaging over the chain links 2". The beds 6, 7 also have pockets for locating with end portions of vertical links adjacent to the horizontal links 2".

Figure 3:
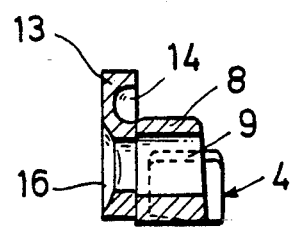
FIG. 3 is a sectional view taken along the line III—III of FIG. 2.
Figure 6:
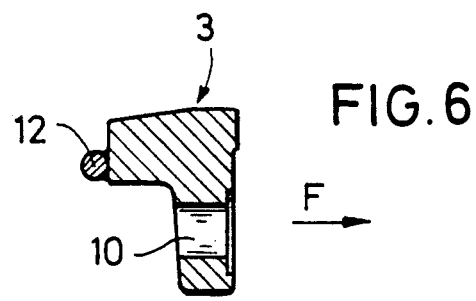
FIG. 6 is a sectional view taken along the line VI—VI of FIG. 5.
Figure 7:
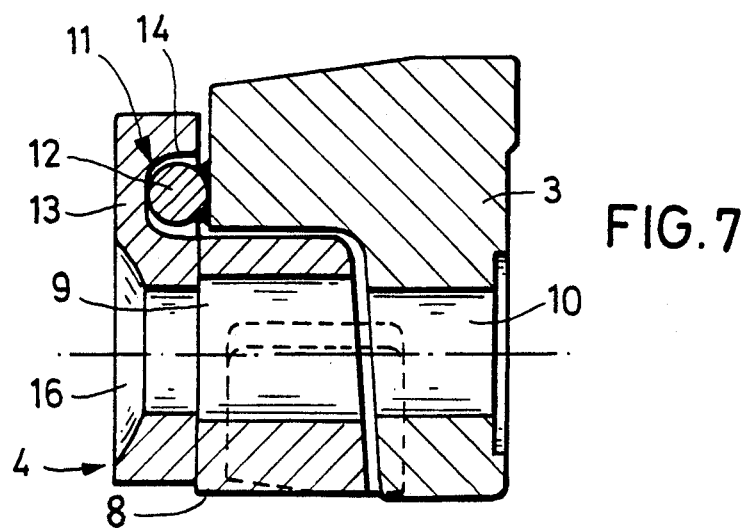
FIG. 7 is a sectional view corresponding to FIG. 6 but on a somewhat larger scale showing the correction between the scraper and the clamping strap.

As shown in FIGS. 3, 6 and 7 the scraper 3 and the strap 4 each have a generally L-shaped cross-section. The strap 4 has upstanding outer wall portions 8 which are offset in relation to the central portion as shown in FIG. 1 and these wall portions 8 possess bores 9. The scraper 3 has upstanding flanges which engage alongside the wall portions 8 as shown in FIG. 7 and these flanges possess bore 10 alignable with the bores 9 to receive the shanks of the bolts of the connectors 5. The bores 9, 10 extend more or less horizontally in the conveying direction F. The construction of the scraper unit 3, 4 thus far described is basically known but in accordance with the invention the strap 4 is pivotally supported on the scraper 3 with pivot bearings 11. The pivot bearings 11 are located above the connectors 5 and are designed so that on tightening of the connectors 5 the strap 4 will tend to exert an upwardly directed clamping force on the links 2".

Figure 4:
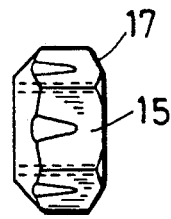
FIG. 4 depicts a nut used with the screw connector of the scraper unit.
Figure 5:
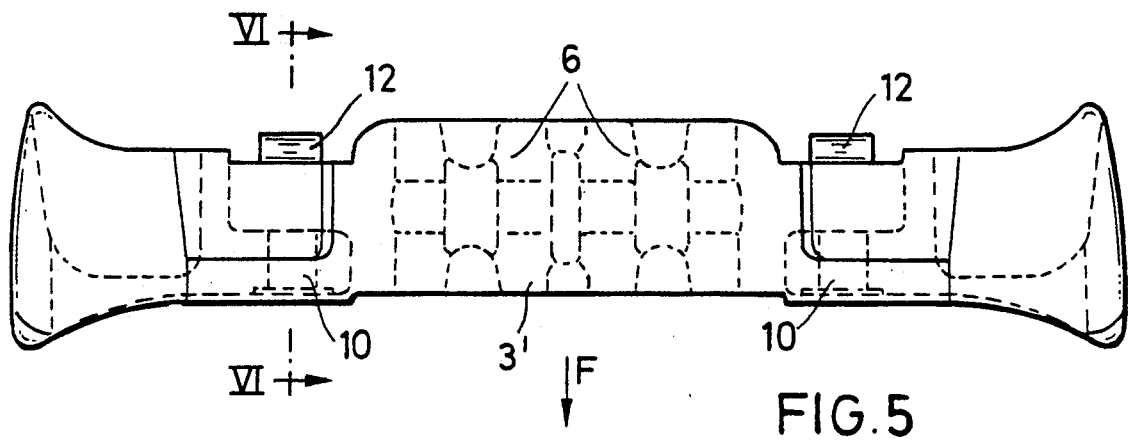
FIG. 5 is a plan view of the scraper unit constructed in accordance with the invention.

The bearings 11 are composed of open bearing recesses and projections fitting therein. In a preferred embodiment the bearing recesses take the form of, e.g. cups, in the strap 4 and the projections take the form of, e.g. bearing journals, on the scraper 3. As illustrated in FIGS. 5 to 7 the scraper 3 has projections 12 in the form of rounded dogs on an outer face above the bores 10 while the strap 4 has corresponding bearing cups 14 for receiving the dogs 12. The cups 14 are in the form of open recesses in upwardly extending projections 13 extending above the head portion 3' of the scraper 3 and locating over or behind the head portion 3'. In fitting the unit 3, 4 to the chains 2, 2' the strap 4 is positioned beneath the links 2" and manoeuvred to bring the cups 14 onto the dogs 12 of the scraper 3. The strap 4 can then pivot vertically about axes extending normal to the longitudinal axis of the scraper 3 defined by the pivot bearings 11. The bolts of the connectors 5 are introduced in the aligned bores 9, 10 of the scraper 3 and the clamping strap 4 and the nuts 15 (FIG. 4) are tightened onto the bolts at the rear of the strap 4. As the nuts 15 are tightened the strap 4 experiences a torque which subjects the strap 4 to force in the upward direction towards the links 2". The links 2" thus become firmly clamped between the head portion 3' of the scraper 3 and the strap 4. Since the bolts are likewise displaced vertically as the nuts 14 are tightened up the bores 10 should have adequate clearance with respect to the bolts. The strap 4 is provided with counter-bored recesses 16 leading to the bores 9 which act as bearing cups for the nuts 15. The nuts 15 are accordingly each provided with a part-spherical relief 17 so that the nuts 15 fit into the bearing cups 16 and tilting of the bolts is prevented. As a result of the disposition of the bearings 11 a relatively long lever is provided to pivot the strap 4 as the nuts 15 are tightened up to produce a positive clamping action.

As shown in FIGS. 1 and 5, the pivot bearings 11 are positioned at the rear of the unit 3, 4 relative to the conveying direction F. It is however quite feasible to arrange the bearings 11 on the front of the unit 3, 4 relative to the conveying direction F.

The projections or dogs 12 can be welded to the scraper 3 or fabricated integrally. The apertures or cups 14 need not be on the strap 4 they can instead be provided on the scraper 3 while the projections 12 are then provided on the strap 4.

In another modification the dual chains 2, 2' can be replaced by a single chain and in this case since only one link 2" is to be trapped between the scraper 3 and the strap 4 only one pivot bearing 11 needs to be provided.

I claim:

1. In a scraper-unit for a scraper-chain assembly, said unit comprising a scraper and a clamping strap which are connected together with one or more screw-threaded connectors engaged in bores to fasten the unit to one or more horizontal links of at least one elongate oval link chain, the strap forming a bed for supporting the horizontal link with the bores extending generally parallel to the longitudinal direction of the chain; the improvement comprising a pivot joint pivotably connecting the scraper and the clamping strap and serving to create a clamping force on the one or more horizontal chain links and directed transversally to the chains as the or each screw-threaded connectors is tightened and fastened.

2. A unit according to claim 1 wherein the scraper has a pivot journal which engages in a complementary bearing cup of the clamping strap to establish the pivot joint.

3. A unit according to claim 1 wherein there are two pivot joints disposed outwardly from either side of the chain link or links.

4. A unit according to claim 1 wherein the pivot joint is made in the style of a rounded dog or employs a rounded dog.

5. A unit according to claim 2 wherein the pivot journal is formed integrally with the scraper.

6. A unit according to claim 1 wherein the pivot joint is disposed in an upper region of the scraper and above the bores for the screw-threaded connector or one of the connectors.

7. A unit according to claim 1 wherein the scraper has a generally L-shaped cross-section at least in a region of a bore for receiving the screw-threaded connector or one of the connectors and is composed of a vertical wall portion and a horizontal wall portion, the bore being provided in the vertical wall portion and a part of the pivot joint being provided at the end of the horizontal wall portion.

8. A unit according to claim 3 wherein the clamping strap has projections which form part of the pivot joints.

9. A unit according to claim 8 wherein the projections have part-spherical cup like recesses forming part of the pivot joints.

10. A unit according to claim 9 wherein the recesses are arranged on an outer face of the clamping strap.

11. A unit according to claim 1 wherein the screw-threaded connector or each of the connectors engage in the bores with clearance.

12. A unit according to claim 1 wherein the screw-threaded connector or each of the connectors comprise a nut and bolt, the clamping strap has a recess forming a bearing cup for the nut and the nut is provided with a counter face to engage with the bearing cup.

13. A unit according to claim 1, wherein the scraper has a central head portion with a recess at the underside for receiving the clamping strap and the scraper and the strap are provided with alignable bores for receiving the screw-threaded connector.

14. A unit according to claim 13 wherein the head portion and the strap have flat shaped beds for locating the link or links of the chain.

* * * * *